United States Patent Office 2,911,390
Patented Nov. 3, 1959

2,911,390
FLUORINATED POLYURETHANE RESINS

Donald D. Smith, Midland, Mich., assignor to Dow Corning Corporation, Midland, Mich., a corporation of Michigan No Drawing. Application May 17, 1956
Serial No. 585,408

1 Claim. (Cl. 260—77.5)

This invention relates to the condensation products of fluorinated diols and diisocyanates.

It is the object of this invention to prepare novel polyurethane resins having superior thermal stability to those presently known. Another object is to prepare polyurethane resins which are useful as coating compositions both for electrical conductors and for wood and other surfaces. Other objects and advantages will be apparent from the following description.

This invention relates to a polymeric composition of matter the unit formula $$[-OCH_2(CF_2)_nCH_2OOCNHRNHCO-]$$

in which $n$ is an integer of at least one and R is of the group divalent hydrocarbon radicals and fluorinated divalent hydrocarbon radicals.

The polymeric compositions of this invention are prepared by reacting glycols of the formula $$HOCH_2(CF_2)_nCH_2OH$$

with diisocyanates of the formula OCNRNCO. The reaction proceeds in the usual manner to give the polyurethane resins of this invention.

For the purpose of this invention $n$ can have any value from 1 up. Preferably $n$ has a value from 1–5 inclusive. These glycols are known materials and are prepared starting with the corresponding 1,2-dichloroperfluoroalkene. The double bond of the alkene is oxidized to produce a dicarboxylic acid which is then reduced to give the glycols used in this invention.

In the diisocyanates employed in the process of this invention R can be any divalent hydrocarbon radical such as aliphatic radicals such as ethylene, butylene, hexylene and octadecylene; any cycloaliphatic hydrocarbon radical such as cyclopentylene and cyclohexylene; and any arylene hydrocarbon radical such as phenylene, xenylene, tolylene, xylylene and ethylphenylene. R can also be any fluorinated divalent hydrocarbon radical. The fluorinated radicals can range from those having one fluorine to completely fluorinated radicals. Thus specific examples of such fluorinated radicals are those in which R is perfluoroethylene, perfluorobutylene or $\alpha,\alpha,\alpha$-trifluoromethylphenylene.

The above diisocyanates are known materials and those containing a perfluoro radical are best prepared by reacting the corresponding perfluorodiamines with phosgene.

The products of this invention can be either thermoplastic or thermosetting. Thermoplastic materials are obtained when an excess of the glycol is used. These materials remain thermoplastic on exposure to the atmosphere but can be cross-linked if desired by reacting with materials which will condense with the hydroxyls such as polybasic acids or additional isocyanate. If an excess of the diisocyanate is employed, the products are initially thermoplastic but will gradually harden and thermoset on exposure to water due to interaction of the water with the terminal isocyanate radicals. Consequently the products of this invention are excellent for protective coatings since they can be applied to a surface and thereafter cured by action of atmospheric moisture.

The following examples are illustrative only and should not be construed as limiting the invention which is properly delineated in the appended claims.

Example 1

5 parts by weight of 2,2,3,3,4,4-hexafluoro-1,5-pentanediol were mixed with 4 parts by weight of hexamethylene diisocyanate and heated at 150° C. for 16 hours. The resulting product was washed with acetone to remove unreacted monomers. The residue was a tough, resilient resin having the unit formula

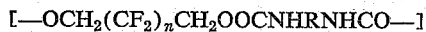

Example 2

Equivalent results are obtained when equivalent amounts of 2,2,3,3,4,4-hexafluoro-1,5-pentanediol and the compound $OCN(CF_2)_4NCO$ are interacted in accordance with the procedure of Example 1. The resulting product has the unit formula

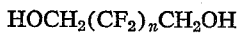

Example 3

Equivalent results are obtained when the glycol $HOCH_2(CF_2)_5CH_2OH$ is reacted with an equivalent amount of toluene 3,5-diisocyanate in accordance with the procedure of Example 1. The resulting product has the unit formula

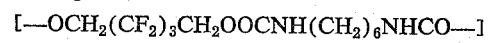

That which is claimed is:

A solid resinous polymeric composition of matter consisting of units of the formula

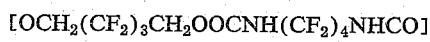

in which $n$ is an integer of from one to five inclusive and R is a radical selected from the group consisting of divalent hydrocarbon radicals and fluorinated divalent hydrocarbon radicals.

References Cited in the file of this patent

UNITED STATES PATENTS

| | | |
|---|---|---|
| 2,511,544 | Rinke | June 13, 1950 |
| 2,625,531 | Seeger | Jan. 13, 1953 |
| 2,726,219 | Hill | Dec. 6, 1955 |

FOREIGN PATENTS

| | | |
|---|---|---|
| 845,917 | France | Aug. 27, 1945 |

OTHER REFERENCES

McBee et al.: "Journal of the American Chemical Society," vol. 74, pages 444–446 (1952). (Copy in Sci. Library.)

"Report on Nomenclature in the Field of Macromolecules," Journal of Polymer Science, vol. 8, pp. 257–277. (Copy in Sci. Library.)

Heiss et al.: Ind. and Chem. Eng., vol. 46, No. 7, pp. 1498–1503, July 1954. (Copy in Scientific Library.)

UNITED STATES PATENT OFFICE

CERTIFICATE OF CORRECTION

Patent No. 2,911,390                 November 3, 1959

Donald D. Smith

It is hereby certified that error appears in the printed specification of the above numbered patent requiring correction and that the said Letters Patent should read as corrected below.

Column 1, line 41, for "1,2-dichloroperfluoroalkene" read -- 1,2-dichloroperfluorocycloalkene --.

Signed and sealed this 30th day of August 1960.

(SEAL)
Attest:

ERNEST W. SWIDER                         ROBERT C. WATSON
Attesting Officer                           Commissioner of Patents